July 22, 1930.   J. FOTAKIS   1,771,251
COMBINATION REAR VIEW MIRROR SET FOR AUTOMOBILES
Filed Sept. 26, 1929

Inventor:
John Fotakis,
By Shepherd Campbell 1,771,251

UNITED STATES PATENT OFFICE

JOHN FOTAKIS, OF DETROIT, MICHIGAN

COMBINATION REAR-VIEW-MIRROR SET FOR AUTOMOBILES

Application filed September 26, 1929. Serial No. 395,363.

This invention relates to a combination rear view mirror set for automobiles, and it has for its object to provide a device of simple and economical construction, adapted to give the maximum of desirable results in both day and night driving. The rear view mirrors first employed on automobiles comprised mirrors of ordinary construction, i. e., those having highly reflective backings. While such mirrors were very efficient in daylight driving, they were objectionable for night driving, because they reflected into the eyes of the driver, with full force, the rays from the headlights of following automobiles. To cure the foregoing defect, rear view mirrors have recently been proposed, and are now largely used having backings of a dark or black material. These latter mirrors are found to very materially cut down the glare from the headlights of following automobiles, while they still yield a fair service, as reflecting mediums, in daylight. However, they are nowhere near as efficient as rear vision mirrors as the mirrors having the highly reflective backings.

It is the purpose of the present invention to provide a structure having the advantages of the highly reflective mirrors for daylight driving, and the advantages of the so-called "dark" mirrors for night driving.

It is a further object of the invention to provide a mirror set of the character indicated, comprising means for effecting the adjustment of the mirrors in both horizontal and vertical planes, in a manner hereinafter set forth.

Figure 1:
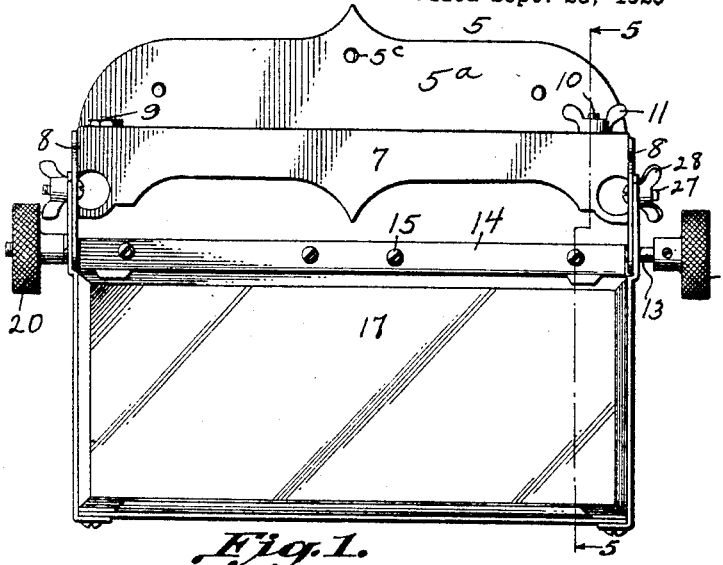
Figure 2:
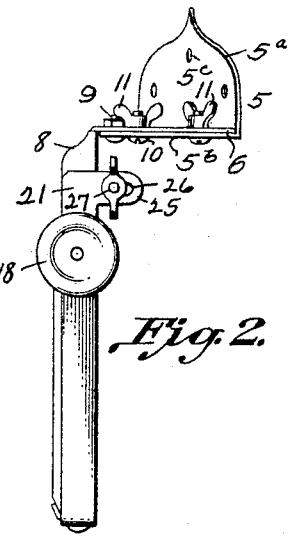
Figure 3:
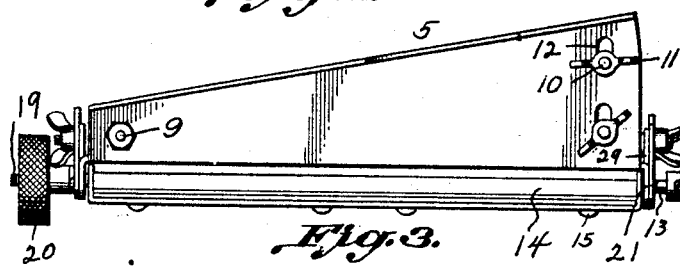
Figure 5:
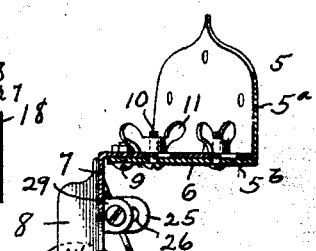
Figure 4:

In the accompanying drawing,

Fig. 1 is a front elevation of a mirror set constructed in accordance with the invention, Fig. 2 is an end elevation thereof, Fig. 3 is a plan view thereof, Fig. 4 is a front elevation with the day mirror raised to expose the night or dark mirror, and Fig. 5 is a vertical sectional view upon line 5—5 of Fig. 1.

Like numerals designates corresponding parts in all of the figures of the drawing.

Referring to the drawing, 5 designates a bracket, comprising the vertical wall $5^a$, and the horizontal wall $5^b$. The vertical wall $5^a$ is adapted to be secured in position upon the automobile, above the glass of the windshield, and inwardly thereof, in the usual and well known way, by screws, (not shown), which pass through openings $5^c$, of the vertical wall $5^a$. Thus, the bracket 5 constitutes a fixed bracket. A movable bracket of L-shape in cross section, comprising a horizontal wall 6, vertical wall 7, and forwardly projecting end flanges 8, is mounted for horizontal adjustment upon the wall $5^b$ by means of a pivot bolt 9 and binding screws 10, the latter being provided with thumb nuts 11. The screws 10 pass through the wall $5^b$, and through arcuate slots 12 of the wall 6, and thus the movable bracket may be adjusted horizontally about the pivot bolt 9 to vary the angle of the mirrors, transversely of the automobile, so that the reflection of the rear window of the automobile, and, consequently, the reflection of the road in the rear thereof, may be accurately positioned in said mirrors. The forwardly projecting depending ears 8 serve as a point of mounting for the round end portions 13, of a bar 14. This bar is preferably angular in cross section, and it has secured thereto, by screws 15, the frame 16 of a bright or day mirror 17, one of the round end portions 13 of the bar having a knurled knob 18 fixed thereon so that, by turning said knob, the bar 14 may be bodily turned to swing the day mirror from the position illustrated in Fig. 1, to the position illustrated in Fig. 4. The other end of the bar 14 is threaded, as indicated at 19, and said threaded portion carries knurled binding screw 20. When this binding screw is tightened, it exerts such binding action between the adjacent ear 8 and the end of the angular portion of the bar 14, as to hold the mirror 17 in the position to which it may have been adjusted. In addition to holding the mirrors in adjusted position, this binding action prevents rattling of the parts, with respect to each other. The round portions 13 of the bar 14 also pass through upwardly extending ears 21, of a mirror frame 22, in which a night or dark mirror 23 is mounted. This mirror may consist of a piece of plain glass, having a sheet of black cardboard 24 therebehind. The passage of the round ends 13 of the bar 14 through the ears 21, in effect pivots the night or dark mirror and its frame upon and with respect to the horizontal adjustable frame, of which the ears 8 constitute a part. The upwardly extending ears 21 are provided with rearward extensions 25, having slots 26, adjusting screws 27, carrying thumb nuts 28, passing through these slots and through rearwardly projecting ears 29, of the wall 7. By loosening these thumb nuts, the dark mirror frame may be adjusted to varying position of angularity with respect to the vertical. Thus, the horizontal adjustment of the frame comprising the walls 6 and 7 provides for the transverse adjustment of the mirrors, while the adjustment provided by the thumb nuts 28 and associated parts provides for the fore and aft or vertical adjustment of the mirrors. The same adjustment which adjusts the vertical angle of the night mirror serves for the adjustment of the day mirror, because it is clear that the day mirror cannot move downwardly and rearwardly further than is permitted by the position to which the night mirror has been adjusted. Thus, if the night mirror is lying at the proper angle to position the reflection of the rear window of the automobile therein, and the day mirror is then swung downwardly thereagainst, it follows that the reflection of said rear window will likewise be visible in the day mirror.

It is to be understood that the invention is not limited to the precise arrangement shown and described, it being clear that many ways will readily suggest themselves to those skilled in the art for mounting a plurality of mirrors to serve the purposes indicated. Therefore, it is to be understood that the invention includes within its purview whatever changes fairly come within either the terms or the spirit of the appended claims.

Having described my invention, what I claim is:—

1. A device of the character described, shaped and dimensioned to serve as a rear view mirror for automobiles, and comprising a fixed bracket, a horizontally adjustable bracket mounted upon the fixed bracket and presenting a forward face which is laterally divergent from the rear portion of the fixed bracket, a frame pivoted upon the horizontally adjustable bracket to swing in a vertical plane, a pair of mirrors, one of which constitutes a bright mirror and the other of which constitutes a dark mirror, one of said mirrors being fixed in said frame and the other of said mirrors being fixed to swing about a horizontal axis into and out of covering position with respect to the fixed mirror, and interengaging binding means between the horizontally adjustable bracket and the frame, for binding said frame in varying positions of inclination with respect to the vertical, said binding means being independent of and in addition to the mounting of the swinging mirror.

2. A device of the character described, shaped and dimensioned to serve as a rear view mirror for automobiles, and comprising a fixed bracket, a horizontally adjustable bracket mounted upon the fixed bracket and presenting a forward face which is laterally divergent from the rear portion of the fixed bracket, a frame pivoted upon the horizontally adjustable bracket to swing in a vertical plane, and a pair of mirrors, one of which constitutes a bright mirror and the other of which constitutes a dark mirror, one of said mirrors being fixed in said frame and the other of said mirrors being fixed to swing about a horizontal axis into and out of covering position with respect to the fixed mirror, means for binding the swinging mirror against movement at either of its limits of movement and means independent of the binding means of the swinging mirror for binding the frame in varying positions with respect to the vertical.

3. The combination with a supporting bracket, of a bar journaled in bearing portions thereof, a frame pivoted to said bearing portion by said bar, a mirror fixed in the frame, a mirror fixedly carried by the bar whereby swinging movement is imparted thereto by the turning of said bar, and means upon one end of said bar for manually imparting turning movement thereto.

4. A device of the character described, shaped and dimensioned to serve as a rear view mirror for automobiles, and comprising a fixed bracket, a horizontally adjustable bracket mounted thereon, a horizontally extending bar mounted to turn in bearing portions of the horizontally adjustable bracket, a frame pivoted with respect to said bearing portions by said bar, a mirror mounted in said frame, a mirror carried by said bar to swing therewith, means for exerting endwise thrust upon said bar to bind the frame and mirror against movement with respect to the horizontally adjustable bracket, means upon one end of said bar for manually turning the same, and means upon the other end of said bar for exerting endwise thrust, as and for the purposes set forth.

5. The combination with a bracket, comprising a vertical rear wall and a forwardly projecting horizontal portion, a second bracket comprising a horizontal portion lying flat against the horizontal portion of the first named bracket, and pivoted thereto at one end, binding means traversing the other end of each of said horizontal portions and permitting limited adjustment between them, forwardly projecting ears carried by the horizontal portion of the second bracket, a bar extending between said ears and having end portions which pass thru said ears, a frame pivoted to said ears by said end portions, a mirror in said frame, and a mirror carried by the bar and adapted to be swung into or out of said frame by the turning movement of the bar.

6. A device of the character described, comprising a fixed bracket, a horizontally adjustable bracket mounted thereon, a light mirror and a dark mirror substantially equal in length to the horizontally adjustable bracket, a frame within which one of said mirrors is mounted, ears at the opposite ends of said frame, forwardly projecting flanges at the opposite ends of the horizontally adjustable bracket with which the said ears of the frame lie in overlapping relation, a bar passing through said ears and flanges and serving to pivot the frame with respect to the horizontally adjustable bracket, means for securing the other of said mirrors to said bar to swing therewith when the bar is turned, means upon one end of the bar for imparting turning movement thereto, and means upon the other end of the bar for exerting endwise thrust thereon.

7. A device of the character described, comprising a fixed bracket, a horizontally adjustable bracket mounted thereon, a light mirror and a dark mirror substantially equal in length to the horizontally adjustable bracket, a frame within which one of said mirrors is mounted, ears at the opposite ends of said frame, forwardly projecting flanges at the opposite ends of the horizontally adjustable bracket with which the said ears of the frame lie in overlapping relation, a bar passing through said ears and flanges and serving to pivot the frame with respect to the horizontally adjustable bracket, means for securing the other of said mirrors to said bar to swing therewith when the bar is turned, means upon one end of the bar for imparting turning movement thereto, means upon the other end of the bar for exerting endwise thrust thereon, and binding means between the ears of the mirror frame and the forwardly extending flanges of the horizontally adjustable bracket for binding the mirror frame in varying positions of vertical adjustments.

In testimony whereof I affix my signature.

JOHN FOTAKIS.